United States Patent [19]

Lineberry

[11] Patent Number: 5,202,765
[45] Date of Patent: Apr. 13, 1993

[54] TELEVISION RECEIVER WITH PICTURE IN PICTURE AND NON-LINEAR PROCESSING

[75] Inventor: Roger L. Lineberry, Indianapolis, Ind.

[73] Assignee: Thomson Consumer Electronics, Inc., Indianapolis, Ind.

[21] Appl. No.: 695,809

[22] Filed: May 6, 1991

[51] Int. Cl.$^5$ .................................. H04N 5/262
[52] U.S. Cl. ................................. 358/183; 358/181; 358/188
[58] Field of Search ............... 358/162, 164, 172, 173, 358/174, 176, 178, 30, 32, 33, 34, 181, 183, 22, 188, 160

[56] References Cited

U.S. PATENT DOCUMENTS

| | | | |
|---|---|---|---|
| 2,760,008 | 8/1956 | Schade | 179/171 |
| 4,367,484 | 1/1983 | Kuroyanagi et al. | 358/181 |
| 4,403,246 | 9/1983 | Thornberry | 358/22 |
| 4,768,083 | 8/1988 | Romesburg | 358/22 |
| 4,802,000 | 1/1989 | Willis | 358/188 |
| 4,809,069 | 2/1989 | Meyer et al. | 358/183 |
| 4,890,162 | 12/1989 | McNeely et al. | 358/138 |
| 4,947,253 | 8/1990 | Neal | 358/183 |
| 4,965,669 | 10/1990 | Canfield et al. | 358/183 |

*Primary Examiner*—Victor R. Kostak
*Assistant Examiner*—Jeffrey S. Murrell
*Attorney, Agent, or Firm*—Joseph S. Tripoli; Peter M. Emanuel; Richard G. Coalter

[57] ABSTRACT

A video switch combines a first video signal with a compressed second video signal for application to a display unit to provide "picture-in-picture" images in which the first video is displayed in a main picture area of the display and the compressed second video signal is displayed as an inset picture within the main picture area. A non-linear processor, connected between an output of the video switch and an input of the display unit, enhances selected features of the combined video signal displayed by the display unit. Circuit means are provided for controlling the non-linear processor so that non-linear processing is applied to displayed images only in the main picture area and not in the inset picture area.

14 Claims, 2 Drawing Sheets

TELEVISION RECEIVER WITH PICTURE IN PICTURE AND NON-LINEAR PROCESSING

FIELD OF THE INVENTION

This invention relates to television receivers and particularly to television receivers having both "picture in picture" processing and non-linear video processing.

BACKGROUND OF THE INVENTION

Television receivers which feature picture-in-picture processing known. In such receivers an inset or "small" picture to be displayed within an area of a "main" or "large" picture is subjected to vertical and horizontal compression by means of selective storage and retrieval from a memory and the compressed picture video signal is inserted within an area of the main picture video signal by means of a multiplex switched that is controlled by timing signals provided by the picture in picture compression processor. Examples of picture in picture compression processors are described, for example, by D;. L. McNeely and R. T. Fling in U.S. Pat. No. 4,890,162 which issued Dec. 26, 1989 and by E. D. Romesburg in U.S. Pat. No. 4,768,083 which issued Aug. 30, 1988.

Non-linear video signal processors are known wherein a video signal is subjected to non-linear amplification within selected portions of the video signal range for providing improved detail in displayed images. O. H. Shade, for example, describes a non-linear video processor featuring both so-called "black stretch" and "white stretch" processing for improving detail in the darker and lighter areas of displayed images in U.S. Pat. No. 2,760,008 which issued Aug. 21, 1956. More recently, integrated circuits have become available providing non-linear picture enhancement functions. An example of such an integrated circuit is the type CX20125 "dynamic picture processing" integrated circuit manufactured by Sony Corp. This integrated circuit provides both "black stretch" processing for improving detail in darker picture areas and also provides a so-called "auto-pedestal" processing function. The auto-pedestal function may be used to adaptively adjust the brightness of a displayed image by inserting a "blacker-than-black" variable amplitude pulse during the back-porch region of the luminance signal. The brightness of a displayed image is altered because the "auto-pedestal" function changes the relationship between the clamping level of a "back-porch" clamp and the level of the video signal which is clamped.

It has been recognized as being desirable to provide both picture in picture processing and non-linear video signal processing (particularly "black stretch" processing) in a television receiver. An example is the Model CTC-169 color television receiver manufactured by Thomson Consumer Electronics Inc. A detailed block diagram of this receiver is shown in FIG. 1 herein and identified as "Prior Art". In this receiver, non-linear (e.g., black stretch) processing is applied to the main video signal prior to the insertion of the compressed auxiliary video signal by the multiplex switch that combines the main and compressed video signals for display.

In more detail, the receiver 10 of FIG. 1 includes an antenna input terminal (ANT) for receiving an RF video input signal S1 and an auxiliary input terminal (AUX) for receiving a baseband video input signal S2. Signal S1 is applied to a tuner and IF processing unit 12 which tunes and demodulates signal S1 to provide another baseband signal S3. A selector switch 14 selects one of signals S2 and S3 as a main video signal S4 for processing and selects the other of signals S2 and S3 as an "inset" video signal S5 for processing. The main video signal S4 is applied to an output terminal 15 labeled "Selected Video Out". This terminal is available for the user to facilitate recording of the main video signal selected by switch 14. The main video signal S4 is also applied to a luminance chrominance signal separation filter 16 that provides separated luminance and chrominance output signals Y1 and C1. The inset video signal S5 is applied to a picture in picture processor 18 that compresses signal S5 vertically and horizontally and provides compressed luminance (Y2) and chrominance (C2) output signals. The main luminance signal Y1 is applied to a non-linear processor 20 which subjects the Y1 signal to black stretch processing for improving detail in low brightness areas of the main picture by applying greater amplification to low level signals than to high level signals. In practice, the processor used is the Sony type CX20125 dynamic picture processor previously discussed. The non-linearly processed main luminance signal Y1', the main chrominance signal C1, and the compressed inset video components Y2 and C2 are applied to a multiplex switch 22 (e.g., a type CD4053 CMOS IC) controlled by a selection signal S6 which inserts the inset video signal components Y2, C2 within a portion of the area defined by the processed main video signal components Y1', C1 to provide picture in picture output signal components Y3 and C3.which, in turn, are applied to a display processor that generates output signals in a suitable form (e.g., RGB) for display by a display device 30 (e.g., a kinescope). The display processor 24 also provides vertical (V) and horizontal (H) blanking signals which are coupled via respective diodes D2 and D1 to an inhibit or blanking input 21 of the non-linear processor 20 for disabling the processor during blanking intervals.

In operation, a user provides operating choices to receiver control unit 32 having outputs connected to tuner 12, switch 14 and processor 18 for controlling, respectively, tuner channel selection, main and inset picture choices and functions such as inset picture on/off and control of the position of the inset picture within the main picture. Multiplex switch 22 inserts the inset picture video (Y2,C2) within the main picture video (Y1',C1 in which the luminance component has been non-linearly processed). The resultant picture in picture video (Y3,C3) is processed for display on kinescope 30 via display processor 24.

SUMMARY OF THE INVENTION

The configuration of the known receiver of applying black stretch processing to the main luminance signal before insertion of the inset picture signal by the multiplex switch advantageously solves an important problem which otherwise would occur if one were to consider providing black stretch processing to the combined main and auxiliary video signal.

Specifically, if non-linear processing (black stretch) is placed after picture in picture insertion the insert picture black level will be modulated as the black stretch circuit dynamically adjust for changes in the main picture scene content. In instances where the insert picture consists of relatively low IRE signals and the main picture consists of relatively high IRE signals, the insert picture can be "stretched" so far towards black level that its blacks are clipped and much of the detail lost. To a lesser extent, the black level of the main picture can be modulated as the black stretch circuits adjust for changing scene content in the insert picture. Because the insert picture is small in comparison to the main picture, this effect is not a great as the one noted above where the main picture is the predominant controlling factor.

Although the prior art technique of providing black stretch processing before picture in picture insertion solves the problem of interference between the main and inset pictures noted above, it lacks two desirable features which can not be achieved if the dynamic processing is applied before small picture insertion. First, the video signal (S4) which is sent to the "selected video output" terminal 15 can not contain the insert picture. The reason why the selected video output of the prior art receiver can not contain the inset picture is that the multiplexed picture in picture signal Y3,C3 contains main picture components that have been non-linearly processed (stretched in the black region) and so the synchronizing component of signal Y3 suffers distortion and thus does not conform to standard broadcast standards. Such a signal is not suitable for recording by a VCR because VCR's commonly use horizontal synchronizing signal amplitude to servo their AGC circuits in an attempt to keep a constant amplitude video signal. Expanded sync would cause a VCR AGC circuit to compress video and wash out the picture in the VCR.

A second feature which can not be realized in the prior art receiver concerns the previously mentioned "autopedestal" function which can be produced by the Sony CX20125 dynamic picture processor. This function inserts an offset pedestal in the back-porch area of the video signal, the amplitude of which is dynamically changed in response to changes in scene content. The back-porch is commonly used by TV receivers for the final DC restoration clamp, and by adding an offset pedestal in this portion of the signal the DC level of the luminance signal (and therefore its brightness) can be modulated. Unfortunately, the "back porch" is conventionally also used by the picture in picture processor processing circuits to properly match the black levels of the insert and main picture. If the "autopedestal" were utilized in the prior art receiver, the offset pedestal would result in a mismatch in black levels between the insert and main pictures which would vary in response to the main picture scene content. Because of this, the "autopedestal" feature of the Sony dynamic picture processor IC is disabled in the prior art receiver.

The present invention is directed to meeting the need for a receiver employing non-linear processing and picture in picture processing which overcomes the foregoing problems.

A television receiver embodying the invention comprises a signal source for providing first and second video signals to be displayed. A picture in picture processor compresses the second video signal vertically and horizontally. A display processor is provided having an input for receiving a video signal for display by a display device coupled to an output of the display processor. A video multiplex switch combines the first video signal with the compressed second video signal responsive to a timing signal provided by the picture in picture processor for forming a combined video signal for application to the input of the display processor such that displayed images are produced in a "picture in picture" format by said display device in which the first video signal is displayed in a main picture area of the display device and the compressed second video signal is displayed as an inset picture located within said main picture area of said display device. A non-linear video processing unit couples the combined video signal provided by the multiplex switch to the input of the display processor for enhancing selected features of the combined video signal displayed by the display device. A circuit means enables the non-linear video processing unit during portions of the combined video signal corresponding to the first video signal and disables the non-linear video processing unit during portions of the combined video signal corresponding to the compressed second video signal so that the non-linear processing is applied to displayed images only in the main picture area and not in the inset picture area of the displayed images.

BRIEF DESCRIPTION OF THE DRAWING

The invention is illustrated in the accompanying drawing wherein like elements are denoted by like reference designators and in which.

DETAILED DESCRIPTION

Figure 1:
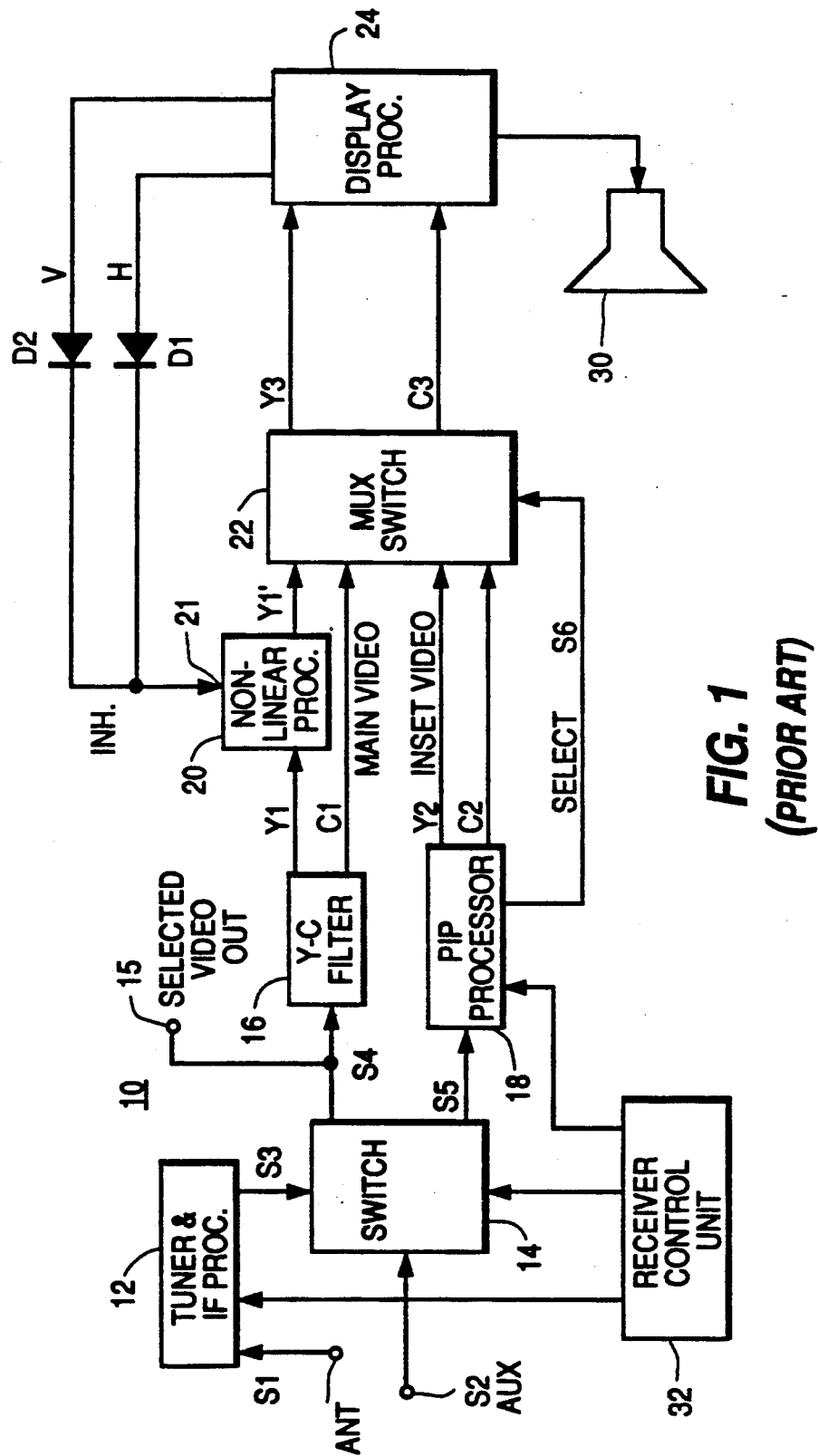
FIG. 1 is a block diagram, partially in schematic form, of a known television receiver having non-linear video processing and picture in picture processing.
Figure 2:
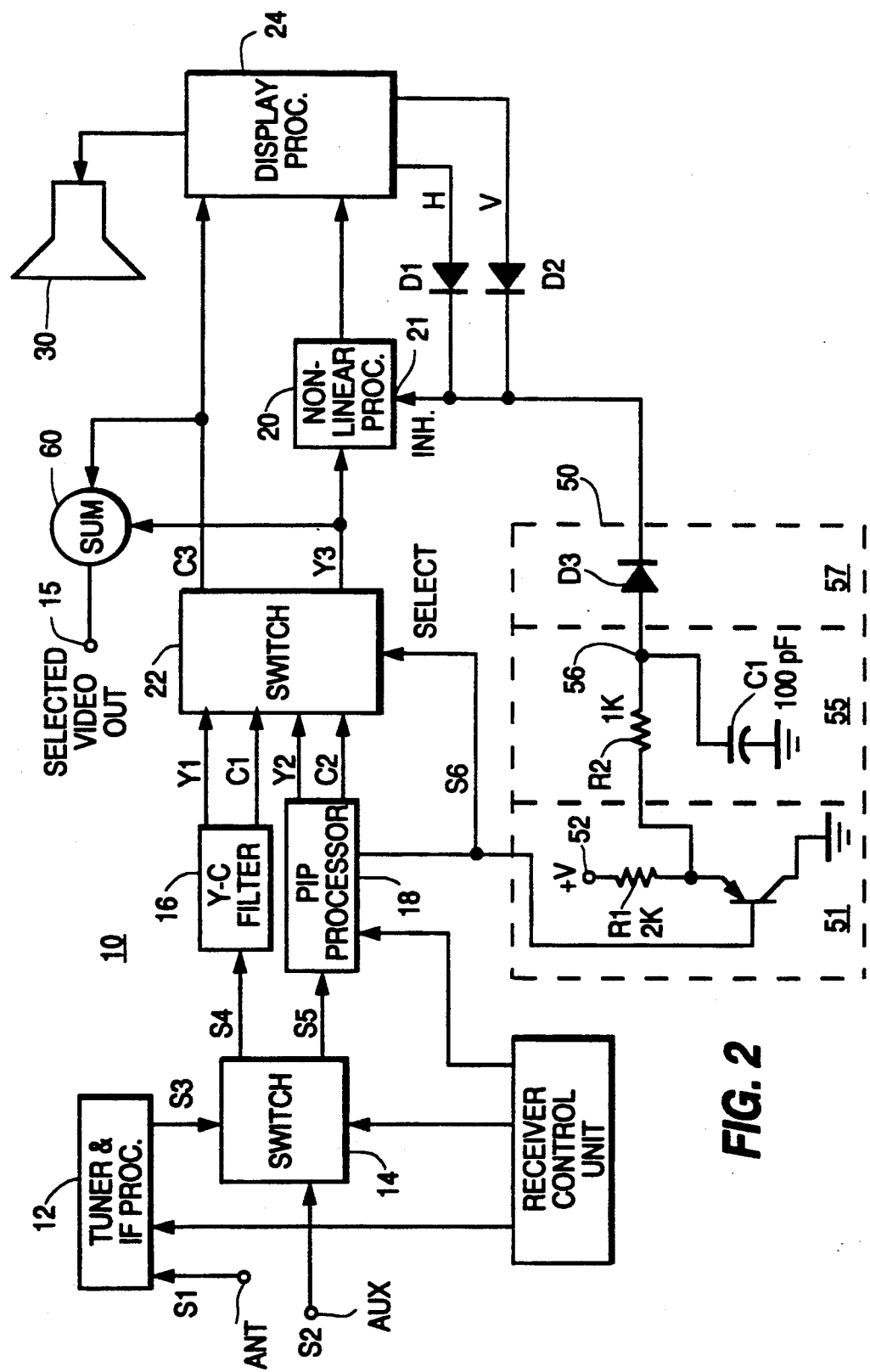
FIG. 2 is a block diagram, partially in schematic form, illustrating modifications to the receiver of FIG. 1 embodying the invention.

FIG. 1 has been previously described and discussed in detail. Modifications to the FIG. 1 receiver, as shown in FIG. 2 and embodying the invention include relocating the non-linear video processor 20 between the luminance signal output of the multiplex switch 22 and the luminance signal input of display processor 24. By this means, the combined (picture in picture) luminance signal Y3 is subjected to black stretch processing. To avoid the problem of main picture contamination of the black level of the inset picture previously discussed, the receiver is also modified by the addition of a coupling circuit 50 which couples the insert selection timing signal S6 provided by picture in picture processor 18 to the inhibit input 21 of the non-linear luminance signal processor 20. This disables non-linear processor 21 during times when the inset picture is being displayed and enables processor 21 only during times when the main video signal is being displayed thereby preventing the black level of the main picture from altering the black level of the inset picture.

Since the reason previously discussed for inhibiting the "autopedestal" feature of processor 20 no longer applies with processor 20 relocated and controlled as described above, this feature may be activated if one selects the Sony dynamic picture processor IC for use as non-linear processor 21. It will be appreciated, of course, that other black stretch processors may be used as processor 20 such as the Hatachi processor or the processor described by Shade as previously discussed.

A further change in the receiver is the addition of a signal summing circuit 60 which combines the picture in picture luminance and chrominance signals Y3 and C3 to provide a combined output signal to the selected video output terminal 15. By this change the selected video output signal includes both the main and inset picture components which could not be done in the prior art receiver for the reasons previously explained. A user thus may tape record exactly what is being displayed by display unit 30 rather than being able to record only the main video signal.

Considering now the details of the signal coupling circuit 50 (outlined in phantom), this circuit includes a buffer amplifier 51 (outlined in phantom) comprising a PNP emitter follower transistor Q1 having a base electrode connected to receive the signal S6, having a collector electrode connected to ground and having an emitter electrode coupled by an emitter load resistor R1 to a source (terminal 52) of positive supply voltage +V. The function of the emitter follower is to reduce loading effects on the source (PIP processor 18) of the selection control signal S6 for switch 22. Loading of this signal line is to be avoided since signal S6 is a very high speed signal that selects the insertion of inset video into the main video. If this signal were to be slowed down by loading effects the result might appear as ragged or blurred edges at the boundaries of the main and inset pictures. Preserving its rise and fall time by emitter follower action avoids this difficulty.

The output of the emitter follower (Q1, R1) is applied to a low pass filter 55 (outlined in phantom) comprising a resistor R2 coupled between the emitter of transistor Q1 and the first plate of a capacitor C1 having a second plate coupled to ground. The output of the low pass filter is taken at the junction 56 of resistor R2 and the first plate of capacitor C1. The purpose of low pass filter 55 is to attenuate harmonics of the fast switching signal S6 that is buffered by emitter follower Q1 and to reduce the potential for radio frequency interference (RFI). Exemplary circuit values for these elements are shown (1000 Ohms for resistor R2 and 100 pico-Farads for capacitor C1).

The remaining portion of coupling circuit 50 includes a unilaterally conductive semiconductor device 57 (outlined in phantom) comprising a diode D3 coupled between the output 56 of filter 55 and the inhibit input 21 of the non-linear processor 20. This diode, in combination with the other diodes D1 and D2 forms a three input OR gate which prevents signals S6, H and V from contaminating or interfering with each other. Alternatively, the gating function may be provided by conventional digital logic.

What is claimed is:

1. A television receiver, comprising:
a signal source for providing first and second video signals to be displayed;
a picture-in-picture processor for compressing said second video signal vertically and horizontally;
a display processor having an input for receiving a video signal for display by a display device coupled to an output of said display processor;
a video multiplex switch for combining said first video signal with said compressed second video signal responsive to a timing signal provided by said picture-in-picture processor for forming a combined video signal for application to said input of said display processor such that displayed images are produced in a "picture-in-picture" format by said display device in which said first video signal is displayed in a main picture area of said display device and said compressed second video signal is displayed as an inset picture located within said main picture area of said display device;
a non-linear video processing unit for coupling said combined video signal provided by said multiplex switch to said input of said display processor for enhancing selected features of said combined video signal displayed by said display device; and
circuit means for enabling said non-linear video processing unit during portions of said combined video signal corresponding to said first video signal and for disabling said non-linear video processing unit during portions of said combined video signal corresponding to said compressed second video signal so that said non-linear processing is applied to displayed images only in said main picture area and not in said inset picture area of said displayed images.

2. A television receiver as recited in claim 1 wherein said non-linear video processing unit is of a type having an inhibit input for disabling the non-linear processing provided by said non-linear processing unit and wherein said circuit means comprises:
a unilaterally conductive semiconductor device coupled between an output of said picture-in-picture processor providing said timing signal to said multiplex switch and said inhibit input of said non-linear video processing unit.

3. A television receiver as recited in claim 2 further comprising a low pass filter coupled in series with said unilaterally conductive semiconductor device between said output of said picture-in-picture processor and said inhibit input of said non-linear processing unit.

4. A television receiver as recited in claim 3 further comprising:
a buffer amplifier coupled in series with said low-pass filter and said unilaterally conductive semiconductor device between said output of said picture-in-picture processor and said inhibit input of said non-linear processing unit.

5. A television receiver as recited in claim 1 wherein said receiver includes a baseband video output terminal;
said video multiplex switch includes a first output providing a chrominance component of said combined video signal and a second output providing a luminance component of said combined video output signal; and further comprising:
signal combining means for combining said chrominance and luminance components of said combined video output signal form a composite video output signal having main and insert picture components neither of which are subjecting to non-linear processing by said non-linear video processing unit; and
means for coupling said composite video output signal provided by said signal combining means to said baseband video output terminal of said receiver.

6. A television receiver as recited in claim 1 wherein said non-linear video processing unit is of a type having an inhibit input for disabling the non-linear processing provided by said non-linear processing unit and wherein said circuit means comprises:
a circuit path coupled between an output of said picture-in-picture processor providing said timing signal to said multiplex switch and said inhibit input of said non-linear video processing unit.

7. A television receiver as recited in claim 6 further comprising:
a low pass filter coupled in series in said circuit path between said output of said picture-in-picture processor and said inhibit input of said non-linear processing unit.

8. A television receiver as recited in claim 6 further comprising:
a buffer amplifier and a low pass filter coupled in series in said circuit path between said output of said picture-in-picture processor and said inhibit input of said non-linear processing unit.

9. A television system, comprising:
first means for providing first and second video signals to be displayed by a display device;
second means for compressing said second video signal;
third means responsive to a timing signal for combining said first video signal with said compressed version of said second video signal for forming a combined video signal such that displayed images are produced in a format in which said first video signal is displayed in a main picture area of said display device and said compressed version of said second video signal is displayed in an auxiliary area of said display device located with respect to said main picture area;
a video processing unit for processing said combined video signal in a predetermined manner; and
fourth means responsive to said timing signal for modifying the operation of said video processing unit during portions of said combined video signal corresponding to said compressed second video signal;
said fourth means enables said video processing unit to operate during portions of said combined video signal corresponding to said first video signal and disables said video processing unit during portions of said combined video signal corresponding to said compressed second video signal;
said receiver includes a baseband video output terminal;
said third means includes a first output providing a chrominance component of said combined video signal and a second output providing a luminance component of said combined video output signal and further comprising:
signal combining means for combining said chrominance and luminance components to form a combined composite video output signal having main and inset picture components, neither of which being subjected to processing by said video processing unit; and
means for coupling said composite video output signal provided by said signal combining means to said baseband video output terminal of said receiver.

10. A television receiver as recited in claim 9 wherein:
said video processing unit is of a type having an inhibit input for disabling the processing provided by said processing unit and wherein said fourth means comprises a circuit path for coupling said timing signal to said inhibit input of said video processing unit.

11. A television receiver as recited in claim 10 wherein:
said circuit path includes a unilaterally conductive semiconductor device.

12. A television receiver as recited in claim 10 wherein:
said circuit path comprises a series connection of a buffer amplifier, a low pass filter and a diode.

13. A picture-in-picture television system, comprising:
a first source providing a main picture video signal;
a second source providing a inset picture video signal;
a switch for inserting said inset picture video signal in said main picture video signal to provide a picture-in-picture video signal for display by a display device; characterized by:
a non-linear video processor for coupling said picture-in-picture video signal to a display device, said non-linear processor having an ON/OFF control input terminal; and
circuit means, coupled to said ON/OFF input terminal of said non-linear processor, for turning said non-linear processor ON during display of said main picture video signal and for turning said non-linear processor OFF during display of said inset picture.

14. A picture-in-picture television system as recited in claim 13 further characterized by:
an output coupled to said switch at a point before said non-linear processor, for providing a picture-in-picture video output signal in which neither the main picture nor the inset picture video components thereof are subjected to said non-linear processing by said non-linear video processor.

* * * * *